United States Patent
Ahmad et al.

(10) Patent No.: US 7,902,794 B2
(45) Date of Patent: Mar. 8, 2011

(54) OVER-VOLTAGE PROTECTED BATTERY CHARGER WITH BYPASS

(75) Inventors: Faisal Ahmad, San Jose, CA (US); Han-Suk Seo, Seoul (KR)

(73) Assignee: Intersil Americas Inc., Milpitas, CA (US)

( * ) Notice: Subject to any disclaimer, the term of this patent is extended or adjusted under 35 U.S.C. 154(b) by 695 days.

(21) Appl. No.: 11/931,969

(22) Filed: Oct. 31, 2007

(65) Prior Publication Data
US 2009/0009138 A1    Jan. 8, 2009

Related U.S. Application Data

(60) Provisional application No. 60/947,700, filed on Jul. 3, 2007.

(51) Int. Cl.
*H02J 7/00* (2006.01)
(52) U.S. Cl. .......................................... 320/137; 320/128
(58) Field of Classification Search ................... 320/137
See application file for complete search history.

(56) References Cited

U.S. PATENT DOCUMENTS

| | | | | |
|---|---|---|---|---|
| 4,907,230 A | * | 3/1990 | Heller et al. ................... | 714/724 |
| 5,598,041 A | * | 1/1997 | Willis .............................. | 307/43 |
| 6,137,265 A | * | 10/2000 | Cummings et al. ........... | 320/133 |
| 6,977,486 B2 | * | 12/2005 | Choi .............................. | 320/149 |
| 7,471,061 B2 | * | 12/2008 | Shah et al. ..................... | 320/107 |

FOREIGN PATENT DOCUMENTS

| | | |
|---|---|---|
| KR | 1999-0044601 | 6/1999 |
| KR | 2005-0057693 | 6/2005 |

OTHER PUBLICATIONS

Jin-Yong Bae; Office Action, Korean Patent Application No. 2008-57720; Apr. 29, 2010.

* cited by examiner

*Primary Examiner* — Edward Tso
*Assistant Examiner* — M'Baye Diao
(74) *Attorney, Agent, or Firm* — Howison & Arnott, L.L.P.

(57) ABSTRACT

A battery charger comprises charging circuitry for providing a battery charging voltage responsive to an input voltage. First circuitry provides both over-voltage protection and an input voltage bypass signal responsive to the input voltage. The first circuitry includes a low impedance switch having a resistance of at least 500 mΩ for connecting the input voltage to an output voltage node. The first circuit also includes a higher impedance switch having a resistance of at least 1000 mΩ for providing the input voltage as a voltage bypass signal.

16 Claims, 5 Drawing Sheets

OVER-VOLTAGE PROTECTED BATTERY CHARGER WITH BYPASS

CROSS-REFERENCE TO RELATED APPLICATIONS

This Application claims benefit of Provisional U.S. Patent Application No. 60/947,700, filed Jul. 3, 2007, and entitled OVER-VOLTAGE PROTECTED BATTERY CHARGER WITH BYPASS which is incorporated herein by reference.

TECHNICAL FIELD

The present invention relates to battery chargers, and more particularly, to battery chargers including over-voltage protection and bypass circuitry.

BACKGROUND

A battery charger is a device used to put energy into a rechargeable cell or battery by forcing an electric current through the cell or battery. The charge current generated by the battery charger is provided responsive to a provided input voltage which in some applications may be provided from an AC adapter or USB port. Battery chargers accept the input voltage from the external source, such as an AC adapter or USB port, and using a chemistry dependent charging algorithm, charge the battery or battery cell to a desired voltage level. A common issue encountered in battery charging applications is that the input voltage may exceed the maximum voltage rating of a charging transistor included within the charging circuitry. This may cause damage to the device that is being charged and potentially lead to battery failures within the electronic device.

One solution which has been used to prevent damage from an over-voltage condition within an electronic device being charged is the insertion of an over-voltage protection circuit between the input voltage and the battery charger. Referring now to FIG. 1, there is illustrated a prior art embodiment of an over-voltage protection circuit 100. An input voltage $V_{IN}$ is applied to node 102 of the over-voltage protection circuit 100 at node 102. The input voltage $V_{IN}$ is applied to a positive input of an over-voltage comparator 104. A reference voltage $V_{REF}$ is also applied to the over-voltage protection circuit 100 at the negative input of the over-voltage comparator 104. The input voltage $V_{IN}$ is applied through a transistor 106 having its source/drain path connected between node 102 and node 108. The gate of transistor 106 is connected to the output of the over-voltage comparator 104. The transistor 106 is an over-voltage protection MOSFET which is controlled by the over-voltage protection comparator 104 connected to a gate of the transistor 106. Transistor 106 is rated to a voltage that exceeds the maximum voltage that a system would be provided as the input voltage $V_{IN}$. When the input voltage $V_{IN}$ applied to the input node 102 is determined by the over-voltage comparator 104 to exceed the reference voltage $V_{REF}$, a control signal applied to the gate of transistor 106 from the comparator 104 turns off transistor 106 to disconnect the input voltage $V_{IN}$ from charging the battery.

A second transistor 110 has its source/drain path connected between node 108 and the output voltage node $V_{BAT}$ 112. The transistor 110 is a charging MOSFET which is controlled by the chemistry dependent charge control circuit 114. Often a device being charged needs some current from the input voltage directly but cannot tolerate high input voltages. Thus, a connection is made at the drain of the transistor 106 at node 108 to provide an over-voltage protective input voltage shown as $V_{IN}$_BYPASS thru transistor 110. The transistors 106 and 110 are low impedance transistors which are more expensive than higher impedance transistors and larger. There is a need to provide a smaller, less expensive and simplified method of providing over-voltage protection.

SUMMARY

The present invention, as disclosed and described herein, comprises a battery charger including charging circuitry for providing a battery charging voltage responsive to an input voltage. The battery charger further includes first circuitry for providing both over-voltage protection and an input voltage bypass signal responsive to the input voltage. The first circuitry includes both a low impedance switch having a resistance of not less than 500 mΩ for connecting the input voltage to an output voltage node and a higher impedance switch having a resistance of not less than 1000 mΩ for providing the input voltage as a voltage bypass signal.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
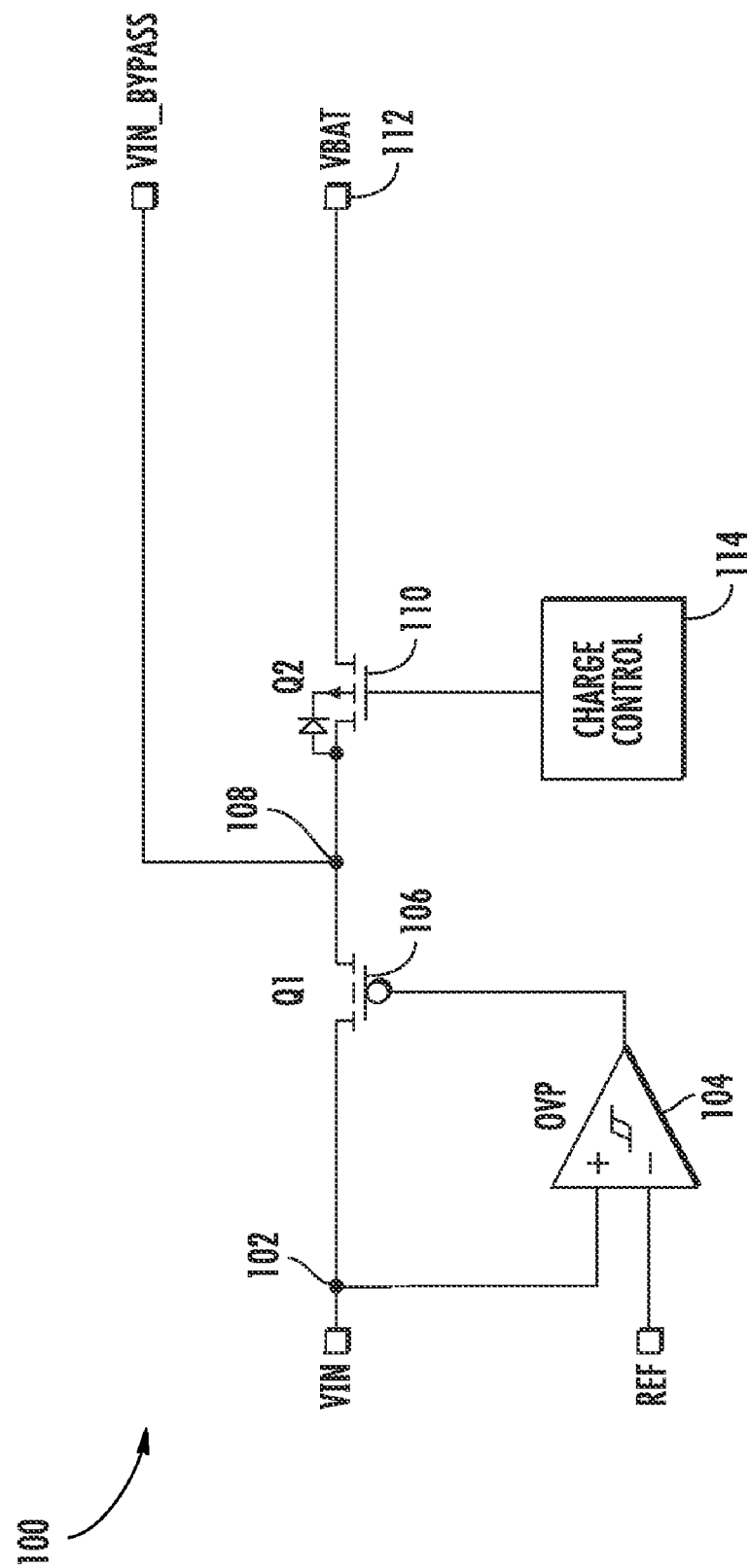
FIG. 1 illustrates a prior art embodiment of an over-voltage protection circuit.

Referring now to the drawings, wherein like reference numbers are used herein to designate like elements throughout the various views, embodiments of the present disclosure are illustrated and described, and other possible embodiments of the present disclosure are described. The figures are not necessarily drawn to scale, and in some instances the drawings have been exaggerated and/or simplified in places for illustrative purposes only. One of ordinary skill in the art will appreciate the many possible applications and variations of the present disclosure based on the following examples of possible embodiments of the present disclosure.

Figure 2:
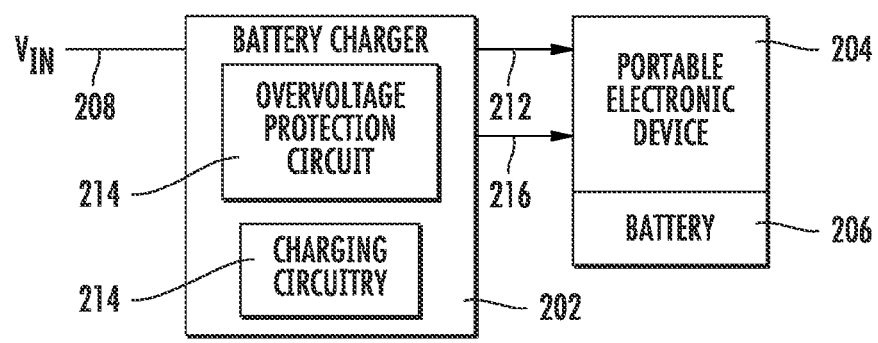
FIG. 2 is a block diagram of a battery charger interconnected to a portable electronic device having a rechargeable battery therein.

Referring now to FIG. 2, there is illustrated a block diagram of a battery charger 202 interconnected with a portable electronic device 204 having a rechargeable battery 206 incorporated therein. The battery charger 202 includes an input 208 for receiving an input voltage $V_{IN}$. The battery charger 202 further includes charging circuitry 210 that, responsive to the input voltage $V_{IN}$ applied at input 208, generates a charging current and charging voltage that is applied to the portable electronic device 204 through an output connection 212. The input voltage $V_{IN}$ applied to the battery charger 202 and charging circuitry 210 can in some cases be too high such that the charging circuit 210 can become damaged. A worst case scenario occurs when the damaged charging circuit 210 creates a condition where the output battery voltage provided on line 212 rises above its normal operating range and can damage the battery 206 within the portable electronic device 204. For example, lithium ion batteries are very susceptible to overcharging caused by over-voltage conditions. Overcharging a lithium ion battery may lead to explosion, flame or other hazardous situations. A battery charger needs to charge the lithium ion battery to a high precision final voltage such that the battery is not overcharged or undercharged. From a safety point of view, it is very critical that a lithium ion battery is properly protected against overcharging.

In order to prevent an over-voltage condition, the battery charger 202 includes over-voltage protection circuitry 214 that can disconnect the input voltage $V_{IN}$ 208, thereby disabling the voltage that is being applied to the portable electronic device 204 through output 212 when an over-voltage condition is detected. Additionally, the over-voltage protection circuitry 214 may provide an input voltage bypass via output 216 that is provided to the system when the input supply is connected.

The battery charging voltage $V_{BAT}$ is applied to the portable electronic device 204 on output 212 and the input voltage bypass is provided to the portable electronic device via output 216. The portable electronic device 204 may comprise any portable electronic device such as a portable computer, cellular telephone, portable entertainment device, MP3 player, PDA or any other portable electronic device that incorporates a rechargeable battery 206 therein. In one embodiment, the battery charger circuitry 202 may comprise for example, the ISL6299A or ISL 9200 devices provided by Intersil Corporation.

Figure 3:
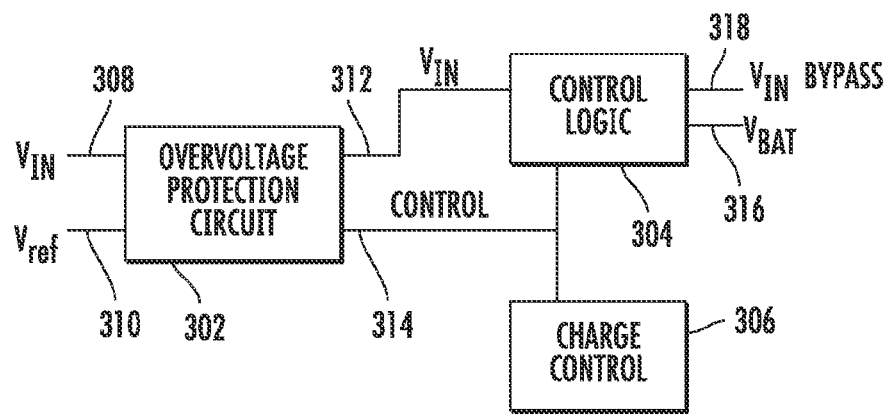
FIG. 3 is a block diagram of an over-voltage protection circuit including bypass circuitry.

Referring now to FIG. 3, there is illustrated a block diagram of an embodiment of a battery charger 202 including an over-voltage protection circuit and bypass circuitry. The circuitry consists of an over-voltage protection circuit 302 providing the input voltage $V_{IN}$ and a control signal. The control signal is applied to control logic 304 which receives a control signal from charge control circuitry 306. The over-voltage protection circuitry 302 is configured to receive an input voltage $V_{IN}$ on input 308 and a reference voltage $V_{REF}$ on input 310. Responsive to the input voltage $V_{IN}$ and the reference voltage $V_{REF}$, the over-voltage protection circuit 302 provides on a first output 312 that is applied to the control logic 304 and a control signal on output 314 that is also provided to the control logic 304.

The control signal applied from the over-voltage protection circuit of output 314 indicates when the input voltage $V_{IN}$ has exceeded the reference voltage $V_{REF}$. This control signal on output 314 is used to disconnect the input voltage $V_{IN}$ from the application to the output 316 as the battery voltage $V_{BAT}$. This control logic 304 disconnects $V_{IN}$ from the $V_{BAT}$ output responsive to the indication from the control signal provided by the over-voltage protection circuit 302. Additionally, the control signal from the over-voltage protection circuit 302 may control whether the input voltage $V_{IN}$ is provided as a bypass signal $V_{IN}$ bypass from the control logic 304 on output 318. When the input voltage $V_{IN}$ does not exceed the reference voltage, the voltage $V_{IN}$ is also applied as $V_{IN}$ bypass. Charge control circuit 306 also provides a control signal to the control logic 304 for disconnecting the application of $V_{IN}$ as $V_{BAT}$ when the battery of the associated electronic device becomes fully charged.

Figure 4A:
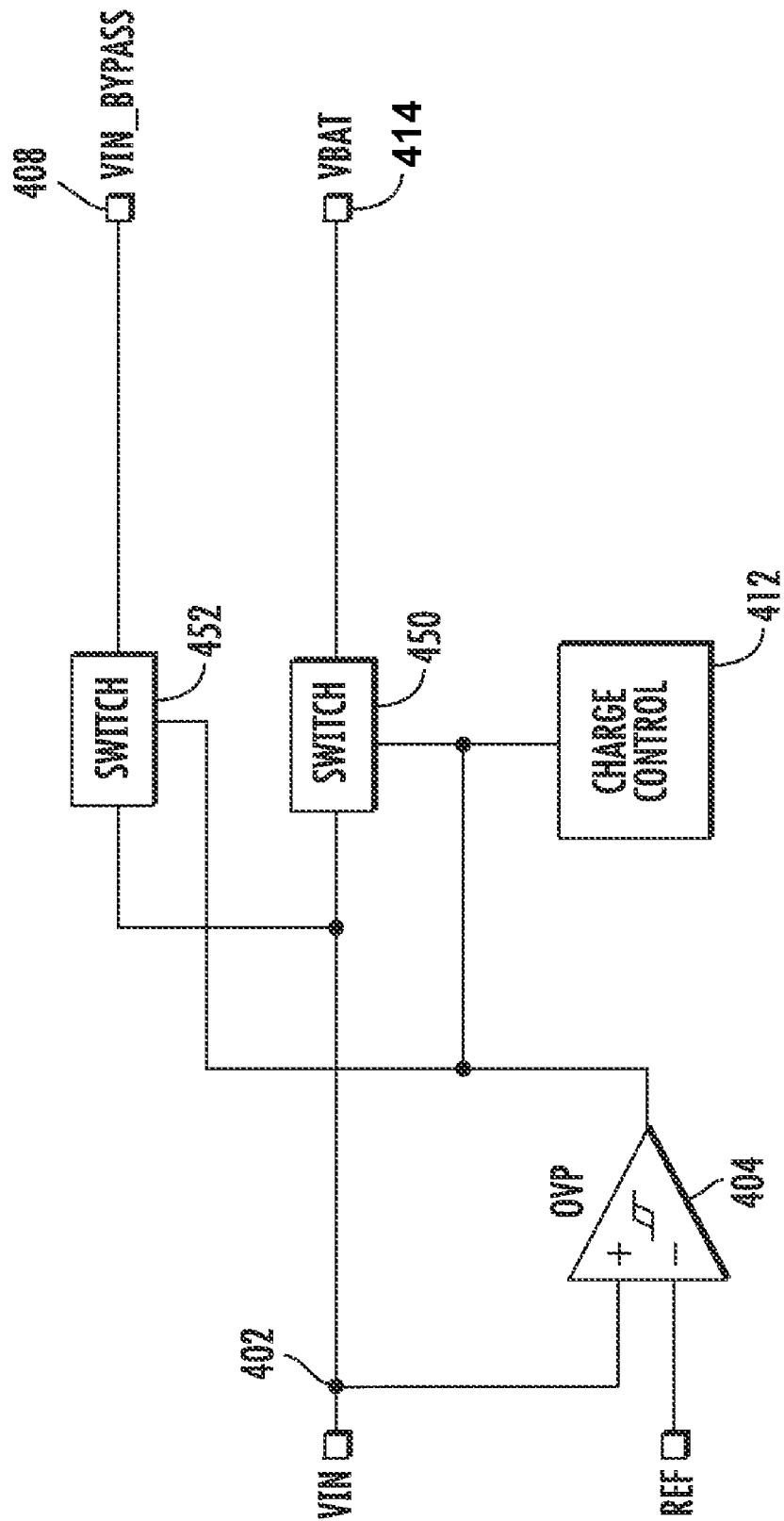
FIG. 4a illustrates the over-voltage protection circuit and bypass circuitry of FIG. 3.

Referring now to FIG. 4a, there is more particularly illustrated the over-voltage protection circuit and bypass circuit of FIG. 3. The circuitry of FIG. 4a has the input voltage $V_{IN}$ applied to an input node 402. The input node 402 is connected to the positive input of an over-voltage protection comparator 404 and to a switch 450. The switch 450 is connected between input voltage node 402 and the output node 414 providing the battery charging voltage $V_{BAT}$. A reference voltage $V_{REF}$ is applied to the negative input of the over-voltage protection comparator 404. The output of the over-voltage protection comparator 404 provides a control signal for turning on or turning off switch 450 connected between node 402 and node 414 and for turning on or turning off switch 452 connected between node 402 and the bypass voltage node 408 providing output signal $V_{IN\_BYPASS}$. The switch 450 is additionally controlled by the charge control circuit 412. Switch 450 may be turned on and off based upon the control signals from the charge control circuit 412 in order to disconnect the input voltage $V_{IN}$ from being applied to the output node 414 providing voltage $V_{BAT}$ in an over-voltage condition. The switch 452 is turned on and off in order to provide a bypass voltage signal $V_{IN}$ bypass at node 408 responsive to the control signal from the over-voltage protection comparator 404 indicating an over-voltage condition.

Figure 4B:
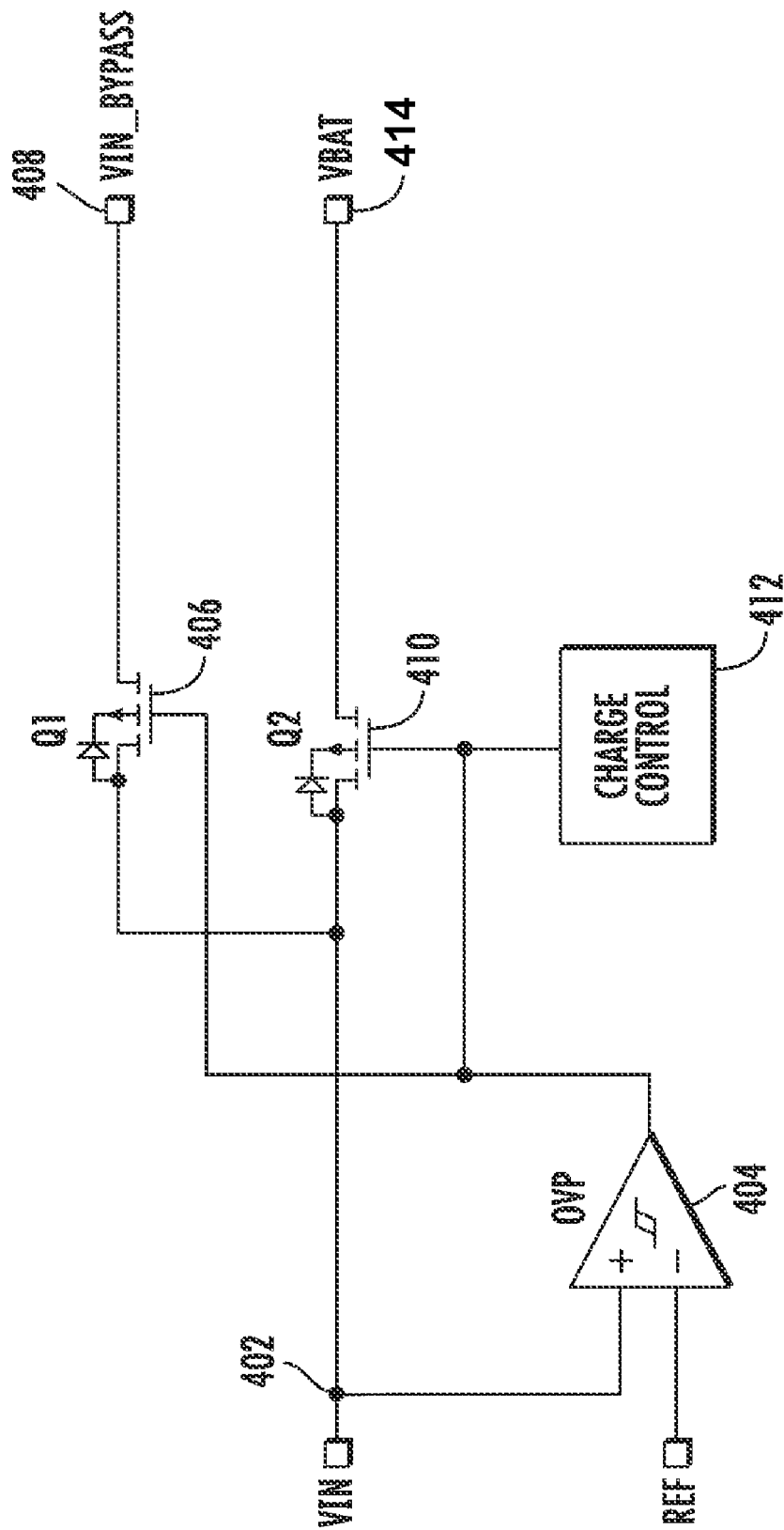
FIG. 4b is a more detailed illustration of the over-voltage protection circuit including bypass circuitry of FIG. 3.

Referring now to FIG. 4b, there is more particularly illustrated a particular embodiment of the over-voltage protection circuit and bypass circuit of FIG. 3. This embodiment uses MOSFET transistors for the switches 450 and 452. However, other types of transistors or switches may be used. The circuitry of FIG. 4 has the input voltage $V_{IN}$ applied to an input node 402. The input node 402 is connected to the positive input of an over-voltage protection comparator 404 and to a transistor 410. The transistor 410 is connected between input voltage node 402 and the output node 414 providing the battery charging voltage $V_{BAT}$. A reference voltage $V_{REF}$ is applied to the negative input of the over-voltage protection comparator 404. The output of the over-voltage protection comparator 404 provides a control signal for turning on or turning off transistor 410 connected between node 402 and node 414 and for turning on or turning off transistor 406 connected between node 402 and the bypass voltage node 408 providing output signal $V_{IN}$ BYPASS. The transistor 410 is additionally controlled by the charge control circuit 412. Transistor 410 may be turned on and off based upon the control signals from the charge control circuit 412 in order to disconnect the input voltage $V_{IN}$ from being applied to the output node 414 providing voltage $V_{BAT}$ in an over-voltage condition. The transistor 406 is turned on and off in order to provide a bypass voltage signal $V_{IN}$ bypass at node 408 responsive to the control signal from the over-voltage protection comparator 404 indicating an over-voltage condition.

Within the circuitry illustrated in FIG. 4b, transistor 410 is the charging MOSFET controlled by the chemistry dependent charge control circuit 412 and the output of the over-voltage comparator 404. The transistor 410 has a voltage rating that exceeds the maximum input voltage into the battery charging system. The charging MOSFET transistor 410 is also controlled by the input of the over-voltage comparator 404 enabling the charging MOSFET to provide the dual functionality for charging and system protection. In order to provide the $V_{IN\_}$ BYPASS signal to the system, a second higher impedance MOSFET 406 is connected to the input voltage node 402 and is controlled by the comparator 404 thus creating an over-voltage protected operating input signal as required by the system. When the input voltage $V_{IN}$ exceeds the reference voltage $V_{REF}$ the output of the comparator 404 turns off transistor 406 providing a bypass voltage pathway. Similar to transistor 410, transistor 406 is also rated to accept high voltages and can block reverse current when the device is turned off. The circuitry illustrated with respect to FIG. 4 is applicable to both single input as well as dual and multiple input battery chargers.

While existing solutions require the use of two low impedance switches to provide the needed system voltages, the circuit of FIG. 4b enables the use of a single low impedance transistor switch 410 to carry the battery charging current and a higher impedance switch 406 to carry the bypass signal. The impedance of transistor 410 may be in the range of 100 mΩ. The impedance of transistor 406 may be in the range of 1000 mΩ. When the input voltage $V_{IN}$ exceeds the reference voltage $V_{REF}$, the over-voltage comparator 404 will provide a control signal to bypass transistor 406 and voltage control capacitor 412. This control signal will turn off transistor 410 to disconnect the input voltage $V_{IN}$ from the output node 414 and will also turn off the transistor 406 to provide a bypass for the input voltage to node 408.

The circuitry of FIG. 4b provides the same functionality as the solution described with respect to FIG. 1 but utilizes smaller and less expensive components. In the circuitry illustrated in FIG. 1, the total impedance of the series path including transistor 106 and transistor 110 is approximately 500 mΩ. Transistor 106 has a resistance value of approximately 300 mΩ and transistor 110 has a resistance of approximately 200 mΩ. Maintaining a total impedance of less than 500 mΩ is a critical specification for the charging path for the situation when the input voltage is at a minimum level and the battery voltage is near its maximum voltage and the charger goes into a drop out state. The circuitry of FIG. 4 eliminates the need for two low impedance over-voltage protected MOSFET transistors by having the charging transistor 410 take on the dual functionality of protection and battery charging. The additional bypass MOSFET transistor 406 can be of a much higher impedance, typically 1 ohm or higher, depending on the system current requirements and is usually much smaller and less expensive than the bypass transistor described with respect to FIG. 1. For further optimization, transistor 410 can be increased from 200 mΩ to 500 mΩ which is another device that can be made smaller and less expensively.

Figure 5:
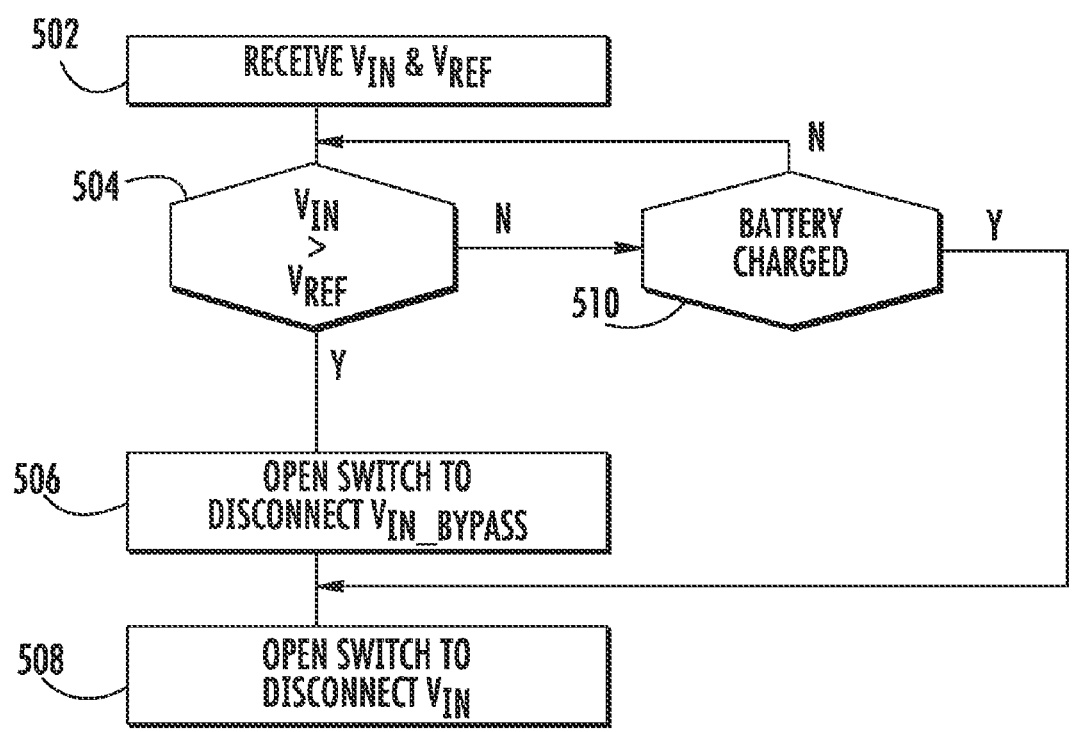
FIG. 5 is a flow diagram illustrating the operation of the circuit of FIGS. 4a and 4b.

Referring now FIG. 5, there is illustrated a flow diagram describing the operation of the circuit of FIG. 4b. Initially, the reference voltage $V_{REF}$ and the input voltage $V_{IN}$ are received by the comparator 404, and the input voltage $V_{IN}$ is applied through the switch 410 to the charging voltage node 414. After the input voltage $V_{IN}$ and reference voltage $V_{REF}$ are received at step 502, inquiry step 504 determines whether the input voltage $V_{IN}$ exceeds the reference voltage $V_{REF}$ using the comparator 404. When the input voltage exceeds the reference voltage, the switch connecting the input voltage to the input voltage bypass node 408 is opened at step 506 to disconnect the input voltage from the Vin_bypass node. Also, at step 508, the switch 410 connecting the input voltage to the battery charging node Vbat 414 is opened to disconnect the input voltage from the battery charging node.

If inquiry step 504 determines that the input voltage does not exceed the reference voltage, inquiry step 510 further determines whether the battery being charged using the Vbat voltage has fully charged the battery within the connected electronic device. If not, control passes back to inquiry step 504. If inquiry step 510 determines that the battery is fully charged, control passes to step 508 and the switch connecting the input voltage to the battery charging node 414 is opened to disconnect the input voltage from the charging node 414.

It will be appreciated by those skilled in the art having the benefit of this disclosure that this invention provides a battery charger having improved over-voltage protection and bypass options from existing chargers. It should be understood that the drawings and detailed description herein are to be regarded in an illustrative rather than a restrictive manner, and are not intended to limit the invention to the particular forms and examples disclosed. For example, transistors other than MOSFETs can be used. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A battery charger, comprising:
    charging circuitry for providing a battery charging voltage responsive to an input voltage;
    first circuitry providing both over voltage protection and an input voltage bypass signal responsive to the input voltage, the first circuitry further including:
        a low impedance switch having a resistance of at least 500 mΩ for connecting the input voltage to an output voltage node;
        a higher impedance switch having a resistance of at least 1000 mΩ for providing the input voltage as a voltage bypass signal; and
        wherein the low impedance switch is turned off and the higher impedance switch is also turned off when the input voltage exceeds a reference voltage.

2. The battery charger of claim 1, wherein the first circuitry further includes a voltage comparator for comparing the input voltage with the reference voltage, the comparator generating a first control signal responsive to the comparison.

3. The battery charger of claim 1, further including a charge control circuit for generating a second control signal to the low impedance switch for disconnecting the input voltage from the output voltage node responsive to a determination relating to a connected battery.

4. The battery charger of claim 3, wherein the determination comprises a determination that the connected battery has completed charging.

5. A battery charger, comprising:
    charging circuitry for providing a battery charging voltage responsive to an input voltage;
    first circuitry providing both over voltage protection and an input voltage bypass signal responsive to the input voltage, the first circuitry further including:
        a voltage comparator for comparing the input voltage with a reference voltage, the comparator generating a first control signal responsive to the comparison;
        a low impedance switch having a resistance of not less than 500 mΩ for connecting the input voltage to an output voltage node responsive to the first control signal;
        a higher impedance switch having a resistance of not less than 1000 mΩ for providing the input voltage as a voltage bypass signal responsive to the first control signal; and
        wherein the low impedance switch is turned off and the high impedance switch is turned on when the input voltage exceeds the reference voltage.

6. The battery charger of claim 5, further including a charge control circuit for generating a second control signal to the low impedance switch for disconnecting the input voltage from the output voltage node responsive to a determination relating to a connected battery.

7. The battery charger of claim 6, wherein the determination comprises a determination that the connected battery has completed charging.

8. Circuitry for providing both over voltage protection and an input voltage bypass signal, comprising:
- a voltage comparator for comparing an input voltage with a reference voltage, the comparator generating a first control signal responsive to the comparison;
- a low impedance switch having a resistance of at least 500 mΩ for connecting the input voltage to an output voltage node responsive to the first control signal;
- a higher impedance switch having a resistance of at least 1000 mΩ for providing the input voltage as a voltage bypass signal responsive to the first control signal; and
- wherein the low impedance switch is turned off and the higher impedance switch is also turned off when the input voltage exceeds the reference voltage.

9. The circuitry of claim 8, wherein the low impedance switch is turned off and the high impedance switch is also turned off when the input voltage exceeds the reference voltage.

10. The battery charger of claim 8, further including a charge control circuit for generating a second control signal to the low impedance switch for disconnecting the input voltage from the output voltage node responsive to a determination relating to a connected battery.

11. The battery charger of claim 10, wherein the determination comprises a determination that the connected battery has completed charging.

12. A charging system, system, comprising:
- a portable electronic device;
- a rechargeable battery for powering the portable electronic device;
- a battery charger circuitry for providing a battery charging voltage to the electronic device for charging the rechargeable battery responsive to an input voltage;
- first circuitry within the battery charger providing both over voltage protection and an input voltage bypass signal responsive to the input voltage, the first circuitry further including:
  - a low impedance switch having a resistance of at least 500 mΩ for connecting the input voltage to an output voltage node;
  - a higher impedance switch having a resistance of at least 1000 mΩ for providing the input voltage as a voltage bypass signal; and
  - wherein the first circuitry further includes a voltage comparator for comparing the input voltage with a reference voltage, the comparator generating a first control signal responsive to the comparison wherein the low impedance switch is turned off and the higher impedance switch is also turned off when the input voltage exceeds the reference voltage.

13. The charging system of claim 12, further including a charge control circuit for generating a second control signal to the low impedance switch for disconnecting the input voltage from the output voltage node responsive to a determination relating to a connected battery.

14. The charging system of claim 13, wherein the determination comprises a determination that the connected battery has completed charging.

15. A method for providing both over voltage protection and an input voltage bypass signal within a battery charger, comprising the steps of:
- generating a battery charging voltage responsive to an input voltage;
- providing the input voltage as a voltage bypass signal;
- comparing the input voltage with a reference voltage, the reference voltage indicating an overvoltage limit;
- disconnecting the input voltage from the battery charging voltage if the input voltage exceeds the reference voltage; and
- disconnecting the input voltage from the voltage bypass signal if the input voltage exceeds the reference voltage.

16. The method of claim 15 further including the steps of:
- determining if a battery being charged by the battery charging voltage is fully charged;
- disconnecting the input voltage from the battery charging voltage if the battery is fully charged.

* * * * *

UNITED STATES PATENT AND TRADEMARK OFFICE
CERTIFICATE OF CORRECTION

| | | |
|---|---|---|
| PATENT NO. | : 7,902,794 B2 | Page 1 of 1 |
| APPLICATION NO. | : 11/931969 | |
| DATED | : March 8, 2011 | |
| INVENTOR(S) | : Faisal Ahmad et al. | |

It is certified that error appears in the above-identified patent and that said Letters Patent is hereby corrected as shown below:

Col. 6, Claim 5, line 58, delete "on" and insert therefor --off--

Col. 7, Claim 9, lines 14-17, delete (cancel) entire Claim 9

Col. 7, Claim 12, line 33, after the word "charger" and before the word "providing" insert --circuitry--

Signed and Sealed this
Fifteenth Day of May, 2012

David J. Kappos
*Director of the United States Patent and Trademark Office*